W. F. MASTERS.
RESILIENT WHEEL.
APPLICATION FILED JULY 7, 1910.
994,684.
Patented June 6, 1911.
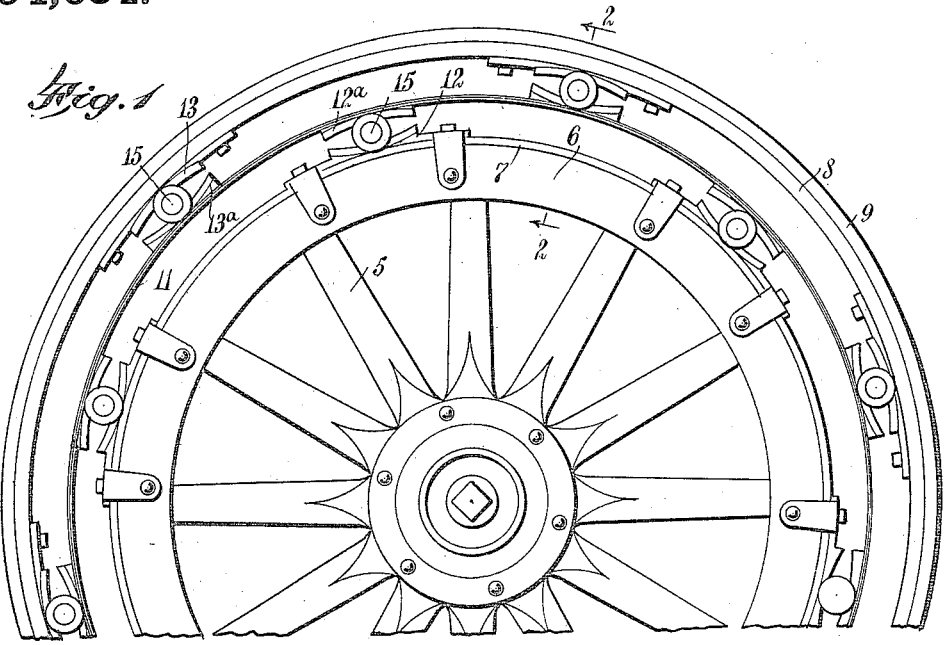
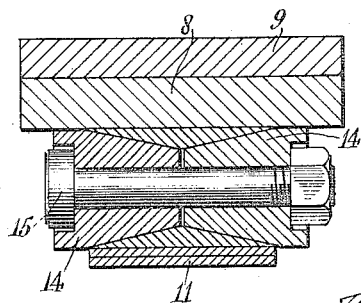
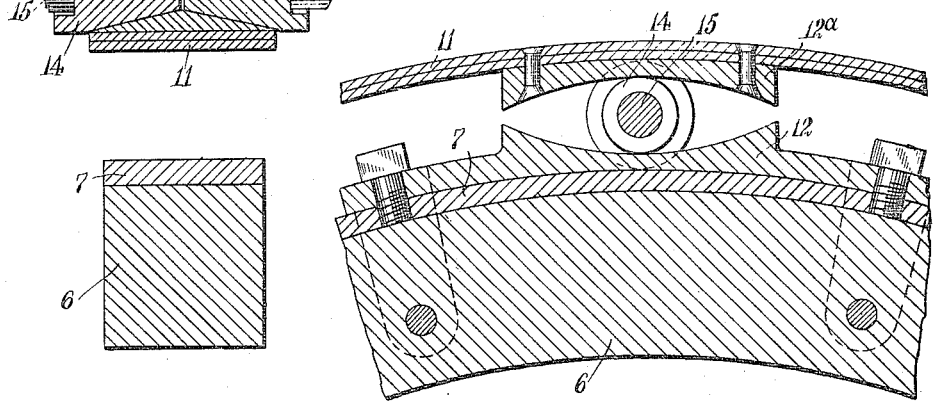
WITNESSES:
INVENTOR
William F. Masters
BY
ATTORNEYS

UNITED STATES PATENT OFFICE.

WILLIAM F. MASTERS, OF NEW YORK, N. Y.

RESILIENT WHEEL.

994,684.

Specification of Letters Patent. Patented June 6, 1911.

Application filed July 7, 1910. Serial No. 570,742.

*To all whom it may concern:*

Be it known that I, WILLIAM F. MASTERS, a citizen of the United States, and a resident of the city of New York, borough of Manhattan, in the county and State of New York, have invented a new and Improved Resilient Wheel, of which the following is a full, clear, and exact description.

The invention is an improvement in resilient wheels, more especially vehicle wheels, although other wheels, such as pulleys, can be constructed in accordance with the invention, with advantage.

The invention has in view a wheel having a tire with roller bearings arranged between the wheel body and tire, which tend to expand the tire and keep the latter under tension by a flattening strain, or a tendency of the tire and body of the wheel to rotate relatively.

Reference is to be had to the accompanying drawings forming a part of this specification, in which similar characters of reference indicate corresponding parts in all the views.

Figure 1 is a fragmentary side elevation of a wheel having my improved tire applied thereto; Fig. 2 is a cross-section of the tire on the line 2—2 of Fig. 1; and Fig. 3 is a fragmentary section taken longitudinally through the inner portion of the tire and wheel felly.

For the purpose of illustrating the nature and application of my improved wheel, I have shown any form of wheel body 5, having the usual felly 6 provided with an inner rim 7, ordinarily in the form of a flat band of metal. Substantially larger and concentrically surrounding the rim 7 is an outer rim 8 covered with a tire proper 9, the latter being ordinarily constructed of spring steel. Intermediate the two rims 7 and 8 and bisecting the annular space formed therebetween is an annular spring 11, shown in the present form of the invention to be made of two leaves, the spring, as also the rim 7, as illustrated in Fig. 2, being relatively narrower than the outer rim and tire, so as to be well protected thereby, as when the wheel scrapes against the curb.

Seated on the outer face of the inner rim at intervals throughout the circumference of the wheel are roller bearings 12, each coacting with an opposed similar bearing 12ª secured to the inner side of the annular spring 11. Each bearing has a concave bearing face curved longitudinally of the tire, whereby the bearing faces of each set of bearings are relatively farther apart at the center than at the ends. Similar bearings 13 and 13ª are respectively secured to the inner side of the outer rim and to the outer side of the annular spring 11, with the several sets of bearings arranged opposite the interval between the sets at the inner side of the annular spring. Each set of bearings is contracted at the center longitudinally of the tire, and is beveled off at the sides, as shown in Fig. 2, and receives a tension roller 14, each roller being divided transversely at the center into two conical roller sections conforming to the beveled or tapered faces of the bearings, and adjustably secured together by a bolt or spindle 15, the outer ends of the roller sections being shown to be counterbored to respectively receive the head and nut of the bolt. By thus constructing the rollers they are easily adjusted to compensate for wear, and admit of the wheel being easily assembled, the assembling of the wheel being carried out by placing the annular spring and outer rim and tire proper over the wheel body in concentric relation, with the respective bearings in register, and then passing the roller sections into the bearings from the opposite sides of the wheel, and after passing the bolts therethrough, applying the nuts and pulling them up by successive portions throughout the wheel until all of the rollers are fairly tight in their bearings, and the body of the wheel is concentric to the tire.

With the improvements applied to a vehicle wheel, as points of the tire are successively compressed by the load of the vehicle, the unsupported portions of the tire and annular spring will tend to straighten or flatten out, which tendency will be resisted by the rollers turning slightly in the bearings and tending to expand the tire and place it under a tension increasing with the inward pressure of the load. In this manner the tire will effectually resist a crushing pressure and be prevented from collapsing. Any tendency of the tire and wheel body to rotate relatively will also be resisted by the roller bearings.

When the invention is applied to such a wheel as a pulley, it exerts a constant tension on the driving belt and exerts a greater tension on the belt as the load increases.

Having thus described my invention, I claim as new and desire to secure by Letters Patent:

1. In a wheel, a wheel body, a tire having a limited rotary movement relatively to the wheel body, sets of bearings arranged at intervals between the tire and wheel body, each set of bearings having opposed concave bearing faces, and a tire tension roller arranged between the bearing faces of each set of bearings and operated by the limited rotary movement between the wheel body and tire.

2. A wheel body, bearings secured at intervals about the wheel body, an annular spring surrounding the bearings, having bearings arranged at the inner side thereof and opposed to the first-named bearings, and having bearings arranged at the outer side thereof opposite the intervals of the first-named bearings, a tire surrounding the annular spring, having bearings arranged on the inner side thereof opposed to the bearings on the outer side of the spring, each set of opposed bearings spaced relatively farther apart at the center than at the ends, and a roller arranged between and bearing on the bearings of each set.

3. A tire having roller bearings arranged at intervals thereabout, the bearings of each set having opposed concave faces and inclining from the center toward each side, and a roller arranged between each set of bearings and conforming to the bearing faces thereof, each roller divided approximately centrally and transversely into two roller sections.

In testimony whereof I have signed my name to this specification in the presence of two subscribing witnesses.

WILLIAM F. MASTERS.

Witnesses:
W. W. HOLT,
PHILIP D. ROLLHAUS.